Patented Jan. 31, 1939

2,145,398

UNITED STATES PATENT OFFICE 2,145,398

YELLOW AZO PIGMENT COMPOSITION

Joseph W. Lang, Woodstown, N. J., assignor to E. I. du Pont de Nemours & Company, Wilmington, Del., a corporation of Delaware No Drawing. Application August 5, 1937,
Serial No. 157,541

9 Claims. (Cl. 260—86)

This invention relates to azo pigment dyes, and especially to new compounds of azo pigment dyes of the type in which acetoacetanilide is coupled with a diazotized nitro-arylamine.

A yellow azo pigment being a product of coupling acetoacetanilide with diazotized meta-nitro-para-toluidine is known. This pigment has good strength but its ability to give as light masstones and as greenish shades as are desired in practical operations is limited. When a lighter and greener shade has been desired, other combinations of the same type of pigment have been used, such as the product of coupling acetoacetanilide and diazotized ortho-nitro-aniline. While the latter pigment is satisfactory from the standpoint of masstone and shade, it is inferior to the former pigment with respect to its tinting strength. When the latter pigment is in the form of press cake, water has a tendency to separate from it upon ageing which, upon drying results in a loss in strength and a darkening of the masstone.

An object of this invention is to produce a yellow pigment dye of the above described type which is lighter in masstone and greener in shade than the pigment made from meta-nitro-para-toluidine but having tinctorial strength superior to mechanical mixtures of the pigments. Another object is to produce such a pigment dye from which water does not separate upon aging when it is in pulp form and which does not darken in masstone nor lose appreciable strength upon drying in plant practice. These and still other objects will be apparent from the following more detailed description.

The objects of the invention are accomplished generally by coupling acetoacetanilide with meta-nitro-para-toluidine and with ortho-nitro-aniline in reaction medium suitable for both coupling reactions, and causing joint precipitation and other reactions between the reactive compounds present. It has been found that the products have greater tinctorial strength than is obtainable by mechanical mixtures of the pigments which contain like amounts of the azo components, but that the desired lighter masstone and greener shade effects are obtained.

This invention is illustrated but not limited by the following examples in which the parts are given by weight.

Example I

Molecular proportions of meta-nitro-para-toluidine and ortho-nitro-aniline, namely 152 parts of meta-nitro-para-toluidine and 138 parts of ortho-nitro-aniline were slurried in 1000 parts of water and 170 pts. of 100% hydrochloric acid. The mixture was cooled with ice to 5° C. and diazotized in the usual manner with 138 parts of sodium nitrite. When diazotization was complete the clear diazo solution was separated from suspended solids by filtration. The solution was added slowly with mixing to a suspension of 362 parts of acetoacetanilide in 4000 parts of water in which were dissolved 408 parts of sodium acetate. When the coupling was complete the pigment was stirred one hour to complete the reaction and precipitation of the product, filtered, washed until the filtrate was neutral to blue litmus, and dried.

Example II

With the same proportions of components used in Example I, the two diazo components were diazotized separately and coupled successively to the acetoacetanilide in either order, the process being otherwise substantially the same as Example I.

Example III

Using the reaction media described in Example I, the two amines were diazotized separately and each was coupled separately to acetoacetanilide at approximately the same time. Immediately after the couplings were completed the pigment slurries were mixed and stirred for one hour to complete the mutual precipitation and then the pigment was filtered off.

It was found that the pigment dyes made in accordance with these methods possessed a much lighter masstone and greener shade than the product formed by coupling diazotized m-nitro-para-toluidine and acetoacetanilide and its strength, light fastness, and bleeding properties were substantially equal thereto. It was also found that the strength of the product was approximately two to three times that of the product of coupling diazotized o-nitro-aniline and acetoacetanilide alone in similar reaction media, and it was much stronger than a physical mixture which was made by mixing the several dye pigments in the same proportions.

It was further observed during the course of the process that the wet 20% press cake obtained upon filtration did not lose strength upon aging several days nor did water separate from it.

It is well known that precipitating a pigment on a base sometimes lends distinctive properties to the resulting lake but because of the dilution of the coloring matter a corresponding decrease in tinting strength is generally found. However in the present case when the less stable, lighter masstone, greener shade but weaker tinting value product of coupling was precipitated on or in the presence of the darker, redder and stronger but more stable product of coupling, there was obtained a product in which the masstone and shade effects were proportional to the same properties of the two components. However in the tinting strength of the new product there was a decided increase in strength which was out of proportion to the ratio which was obtainable from a mechanical mixture.

This increased strength was obtained when the proportions of the several diazo components were varied over wide limits.

Variations in shade were attained by using o-nitro-aniline in proportions of an appreciable amount, say about 1.0% up to about 60% of the total diazo component without an appreciable decrease in strength below the apparent strength of the product made with m-nitro-para-toluidine. Between about 60% and about 90% of o-nitro-aniline the apparent strength decreased slightly but the apparent strength was greater than mechanical mixtures of the pigments which contained similar proportions of the amine groups. With more than about 90% of ortho-nitro-aniline the strength decreased more rapidly but it was greater than in mechanical mixtures until about 95% was present.

As various other modifications can be made which will be apparent to those skilled in the art without departing from the spirit and scope of the invention, it is to be understood that no limitations are intended except those which are expressly recited in the annexed claims or are imposed by the prior art.

I claim:

1. The pigment dye composition which comprises the product of joint precipitation of the products of coupling acetoacetanilide with diazotized ortho-nitro-aniline and diazotized meta-nitro-para-toluidine, the proportion of the aryl group from orto-nitro-aniline being about 1.0% to about 95.0% of the residues from said diazotized amines, said composition having greater tinting value than a mechanical mixture of the coupling products individually coupled and precipitated which contains like amounts of the aryl residues.

2. The pigment dye composition which comprises the product of joint coupling and precipitation of the products of coupling aceto-acetanilide with diazotized ortho-nitro-aniline and diazotized meta-nitro-para-toluidine, the proportion of the aryl groups from the ortho-nitro-aniline being about 1.0% to about 60.0% of the residue from said diazotized amines, said composition having tinting value approximately as great as, masstone lighter, and shade greener than the coupling product of aceto-acetanilide and diazotized meta-nitro-para-toluidine.

3. The pigment dye composition which comprises the product of joint coupling and precipitation of the products of coupling aceto-acetanilide with diazotized ortho-nitro-aniline and diazotized meta-nitro-para-toluidine, the proportion of the aryl group from ortho-nitro-aniline being about 50.0% to about 60.0% of the residue from said arylamines, said composition having tinting strength approximately as great as, masstone lighter, and shade greener than the coupling product of acetoacetanilide and diazotized meta-nitro-para-toluidine, and tinting strength greater than a mechanical mixture of the coupling products individually coupled and precipitated which contains like amounts of the aryl residues.

4. The composition which comprises the product of joint precipitation of the products of coupling acetoacetanilide with diazotized ortho-nitro-aniline and diazotized meta-nitro-para-toluidine, the proportion of the aryl group from ortho-nitro-aniline being about 90.0% to about 95.0% of the residue from said arylamines, said composition having tinting strength greater than a mechanical mixture of the coupling products individually coupled and precipitated which contains like amounts of the aryl residues.

5. In the process of making a compound containing the coupling product of acetoacetanilide with diazotized ortho-nitro-aniline and diazotized meta-nitro-para-toluidine, the step which comprises carrying out at least the final precipitation of said compound in a mixture containing the reaction medium in which both products are coupled.

6. In the process of making a compound containg the coupling product of acetoacetanilide with diazotized ortho-nitro-aniline and diazotized meta-nitro-para-toluidine, the steps which comprise coupling acetoacetanilide with a diazotized mixture of ortho-nitro-aniline and meta-nitro-para-toluidine, and precipitating the compound.

7. In the process of making a compound containing the coupling product of acetoacetanilide with diazotized ortho-nitro-aniline and diazotized meta-nitro-para-toluidine, the steps which comprise coupling acetoacetanilide with a diazotized mixture of approximately molecular proportions of ortho-nitro-aniline and meta-nitro-para-toluidine, and precipitating the product of coupling.

8. In the process of making a compound containing the coupling product of acetoacetanilide with diazotized ortho-nitro-aniline and diazotized meta-nitro-para-toluidine, the steps which comprise separately diazotizing ortho-nitro-aniline and meta-nitro-para-toluidine, successively coupling said diazotized amines with acetoacetanilide, and stirring to complete the precipitation and until a product is formed which has greater tinctorial strength than a mechanical mixture of the coupling products, said diazotized ortho-nitro-aniline being about 1.0% to about 95.0% of said diazotized amines.

9. In the process of making a compound containing the coupling product of acetoacetanilide with diazotized ortho-nitro-aniline and diazotized meta-nitro-para-toluidine, the steps which comprise separately diazotizing ortho-nitro-aniline and meta-nitro-para-toluidine, successively coupling said diazotized amines with acetoacetanilide, and stirring to complete the precipitation and until a product is formed which has greater tinctorial strength than a mechanical mixture of the coupling products, said diazotized ortho-nitro-aniline being about 50.0% to about 60.0% of said diazotized amines.

JOSEPH W. LANG.